G. J. MacDOWELL.
FINDER ATTACHMENT FOR CAMERAS.
APPLICATION FILED NOV. 17, 1916.

1,330,273.

Patented Feb. 10, 1920.

Witnesses:
W. P. Kilroy
Harry R. L. White

Inventor:
Glenn J. MacDowell
By Rudolph Wm. Lotz, Atty.

UNITED STATES PATENT OFFICE.

GLENN J. MacDOWELL, OF CHICAGO, ILLINOIS.

FINDER ATTACHMENT FOR CAMERAS.

1,330,273. Specification of Letters Patent. Patented Feb. 10, 1920.

Application filed November 17, 1916. Serial No. 131,950.

*To all whom it may concern:*

Be it known that I, GLENN J. MACDOWELL, a citizen of the United States, residing at Chicago, in the county of Cook and State of Illinois, have invented certain new and useful Improvements in Finder Attachments for Cameras; and I do hereby declare the following to be a full, clear, and exact description of the invention, such as will enable others skilled in the art to which it appertains to make and use the same.

This invention has for its object to provide a mounting for the finder-housing upon the lens board of a camera or kodak whereby said finder-housing will be held firmly in either of two positions to which it is adapted to be turned in order to position the camera to focus a view within the boundaries of the exposure plane thereof as the camera is turned to present its oblong exposure plane to photograph a view either longitudinally or laterally thereof.

A further object of the invention is to provide coacting means serving the aforesaid purposes which will also prevent the finder-housing from becoming positioned in any other than the two desired positions referred to.

The invention consists in the features of construction and combinations of parts hereinafter fully described and claimed.

In the accompanying drawings illustrating a suitable embodiment of the invention:

Figure 1:
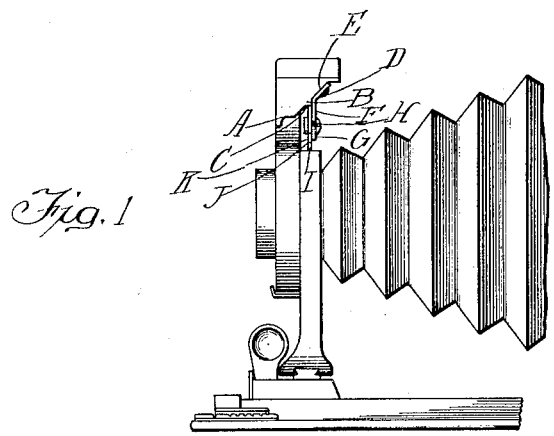
Figure 1 is a fragmentary detail view in side elevation of a lens board carriage and lens board equipped with a finder housing constructed in accordance with the invention.
Figure 2:
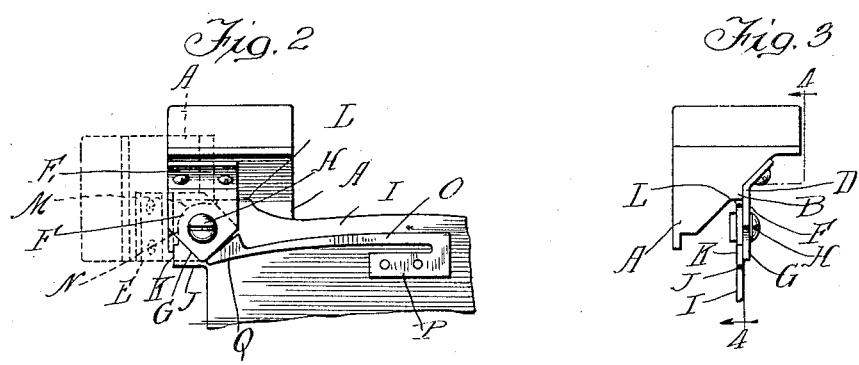
Fig. 2 is a fragmentary detail rear elevation of the upper end portion of the lens board showing the finder housing in full lines in one position and in dotted lines in its other position.
Figure 3:
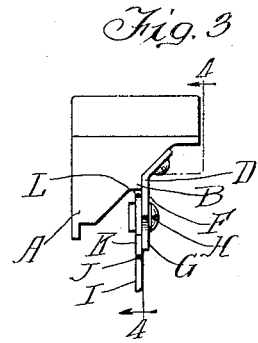
Fig. 3 is a fragmentary detail side elevation of the finder housing and of the upper end portion of the lens board upon which it is mounted.
Figure 4:
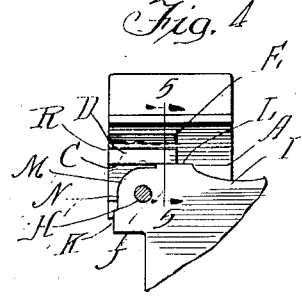
Fig. 4 is a view similar to Fig. 2, certain parts being omitted from illustration.
Figure 5:
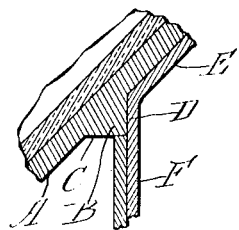
Fig. 5 is a fragmentary detail sectional view on an enlarged scale on the line 5—5 of Fig. 4.

The exposure planes of kodaks and similar cameras are usually oblong and it is desirable sometimes to photograph views and objects so that the photograph image extends in the direction of the diameter of the exposure plane, and sometimes so that it extends in the direction of the long diameter thereof. As these cameras usually employ film-strips which do not permit focusing in the manner of a plate camera, they are equipped with finders which permit the operator to view the picture as it will be focused on the exposure plane thereby enabling him to position the camera so that the view of objects he desires to photograph will be positioned to be focused within the boundaries of the exposure plane. The finders are usually arranged to be turned through an arc of ninety degrees in accordance with the two positions of the camera so that the picture may be taken with its vertical axis extending in the direction of either the long or the short diameter of the exposure plane, and, obviously, its two positions should be accurately disposed ninety degrees apart in order that the picture viewed through the finder may be accurately photographed within the boundaries of the exposure plane and so that the vertical axis of the view or picture shall be at least parallel with the vertical axis or diameter of the exposure plane.

The finder housing, which is provided with a bottom wall A disposed at an angle of forty-five degrees to the front and top walls thereof, is provided between its ends with a transverse rib B having a horizontal surface C and a vertical surface D when the camera is positioned to take a picture.

Secured to the bottom wall A is a plate E having a flange F extending at an angle of forty-five degrees to the body of said plate and resting against and flush with the surface D of the rib B. Said flange F terminates in a projection G having its side edges extending at right angles to each other and at an angle of forty-five degrees to the vertical side edges of said flange. The said flange F is pivotally secured by means of the screw H to the upper end portion of the lens board I of the camera; the latter being provided with a lateral projection J at one of its upper corners which is perforated to receive the shank of the screw H. The said projection J is provided with a vertical edge-portion K and a horizontal edge portion L, the corner formed between said edges being rounded, as at M, and said rounded portion constituting the inner wall of what may be termed an arcuate recess N. The surface C of the rib B is adapted to contact with said shoulders K and L respectively, the latter constituting stops to limit the movement of the finder-housing through an arc of ninety degrees. The axis of the pivot screw H is disposed midway between the vertical side-edges of the flange F and equi-distantly from the middle of each of the inclined edges G thereof. The shoulders or stops K and L are disposed out of alinement with the vertical and horizontal planes respectively, of the axis of the screw H, the recess N terminating in short extensions disposed at an angle of ninety degrees to each other.

Mounted upon the lens-board I is a spring O consisting of a flat plate P of metal riveted to the lens-board I and provided with the arm or spring O terminating at its other end in a shoe Q which bears upon either of the inclined surfaces or edges G of the flange F, the face of the shoe being so positioned that one end portion thereof bears against the said surfaces with which it contacts respectively adjacent the point or apex where they meet. The said shoe thus exerts a pressure upon the inclined surface against which it bears, which tends to turn the flange F in the direction to throw the rib B into contact with one of said surfaces or shoulders K or L, and will resist the turning of the finder-housing in the opposite direction. Thus the finder-housing is firmly held in position so that in one of the latter the rib B is held engaged with the shoulder L, and in the other position with the shoulder K. In turning the finder housing from one of these positions to the other, the apex formed by the meeting of the two inclined edges G will, as it passes over the surface thereof, depress the shoe Q of the spring O, as will be obvious, so that the latter will exert its pressure, as soon as the finder has been turned through an arc in excess of forty-five degrees, to throw it over through the balance of the arc of ninety degrees.

The respective positions of the finder housing are determined by the engagement of the said rib B with the shoulders K and L respectively, and as the latter are disposed at an angle of ninety degrees to each other, it will be obvious that the finder cannot readily be turned through an arc either more or less than ninety degrees, and must be accurately and firmly held in position by the pressure exerted by said spring O.

The invention is obviously capable of some modification, but all modifications and variations thereof which may fall within the scope of the appended claim are included in the invention.

I claim as my invention:

In a photographic camera having a lens-board, a finder housing equipped with a flange pivotally secured between its ends and midway between its side edges to said lens-board, coacting stop formations on the latter and finder for limiting the pivotal movement of the latter to an arc of ninety degrees, said flange having two edge surfaces extending at an angle of ninety degrees to each other and at an angle of forty-five degrees to the side edges thereof, a plate mounted on said lens-board, a spring arm integral with said plate, and a projection at the outer end of said spring having an inclined surface disposed in the path of and in engaging relation to one of said angular edge portions of said flange and coacting with the pivot thereof to hold said coacting stop-formations in engagement with each other for holding said finder in either of its two positions.

In testimony whereof I have signed my name in presence of two subscribing witnesses.

GLENN J. MacDOWELL.

Witnesses:
M. M. BOYLE,
C. W. KIORCH.